(12) United States Patent
Frank et al.

(10) Patent No.: US 8,397,776 B2
(45) Date of Patent: Mar. 19, 2013

(54) TIRE WITH INNERLINER CONTAINING TALC AND EPICHLOROHYDRIN RUBBER

(75) Inventors: Uwe Ernst Frank, St. Wendel (DE); Andreas Frantzen, Trier (DE); Claude Schweitzer, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 811 days.

(21) Appl. No.: 12/331,735

(22) Filed: Dec. 10, 2008

(65) Prior Publication Data
US 2010/0139829 A1 Jun. 10, 2010

(51) Int. Cl.
*B60C 5/02* (2006.01)
(52) U.S. Cl. .......................................... 152/510
(58) Field of Classification Search .................. 152/510
See application file for complete search history.

(56) References Cited

U.S. PATENT DOCUMENTS

| | | | |
|---|---|---|---|
| 3,586,087 A * | 6/1971 | Messerly et al. ............... | 152/510 |
| 5,178,702 A | 1/1993 | Frerking, Jr. et al. .......... | 152/510 |
| 5,385,980 A * | 1/1995 | Schaefer et al. ............... | 525/187 |
| 5,576,372 A | 11/1996 | Kresge et al. .................. | 524/442 |
| 6,348,536 B1 * | 2/2002 | Fourty et al. ................... | 524/451 |
| 7,491,765 B2 * | 2/2009 | Krueger ......................... | 524/451 |
| 2004/0242795 A1 | 12/2004 | Waddell et al. ............. | 525/331.9 |
| 2008/0097021 A1 * | 4/2008 | Krueger ......................... | 524/451 |

FOREIGN PATENT DOCUMENTS

| | | |
|---|---|---|
| DE | 69217939 T2 | 8/1997 |
| DE | 102005004031 A1 | 8/2006 |
| DE | 102008009326 A1 | 8/2009 |
| DE | 102009052720 A1 | 6/2010 |
| EP | 0 832 927 | 5/2000 |
| EP | 1972466 A1 | 9/2008 |
| WO | WO2005/017013 | 2/2005 |
| WO | WO2006/079404 | 8/2006 |
| WO | WO2006/079404 A1 * | 8/2006 |
| WO | 2008060302 A1 | 5/2008 |

OTHER PUBLICATIONS

Abstracts of Papers, International Rubber Conference, Russia, Moscow, Jun. 1-4, 2004.
Luzenac, Ultra-Fine Mistron® Talcs, New Functions for Automotive Applications, Poster presented at International Rubber Conference, Russia, Moscow, Jun. 1-4, 2004.
Luzenac, Press Release, Jun. 2004, Luzenac presents its upgraded Mistron® product range for automotive applications at K2004, pp. 1-2.

* cited by examiner

*Primary Examiner* — Katarzyna Wyrozebski Lee
*Assistant Examiner* — James Bermingham
(74) *Attorney, Agent, or Firm* — John D. DeLong

(57) ABSTRACT

The present invention is directed to a pneumatic tire comprising a carcass and an innerliner in direct contact with the carcass, the innerliner comprising a rubber composition comprising:
- at least one elastomer selected from the group consisting of butyl rubber, chlorinated butyl rubber, brominated butyl rubber, synthetic polyisoprene, natural rubber, styrene butadiene rubber, polybutadiene, copolymer of isobutylene and paramethylstyrene, and brominated copolymer of isobutylene and paramethylstyrene;
- epichlorohydrin rubber; and
- at least one delaminated talc having a BET surface area according to DIN 66131 of 10-40 $m^2/g$, an average particle size ($D_{50}$) of 4-8 microns, determined by laser diffraction measurement, and a lamellarity index of 3-15.

16 Claims, No Drawings

TIRE WITH INNERLINER CONTAINING TALC AND EPICHLOROHYDRIN RUBBER

BACKGROUND OF THE INVENTION

A pneumatic rubber tire is conventionally of a toroidal shape and comprised of a carcass with a cavity in which its closure is typically completed with a rigid rim onto which the tire is to be mounted. Such pneumatic tire and pneumatic tire/rim assembly is well known.

The inner surface of a pneumatic tire, namely a surface of said cavity which is sometimes referred to as an "innerliner" is typically a rubber layer composed of an elastomeric composition designed to prevent, or retard, the permeation of air and moisture into the tire carcass from the aforesaid cavity which becomes the tire's inner air chamber. Such tire innerliners, or innerliner rubber layers, are well known to those having skill in such art.

Butyl rubber is typically relatively impermeable to air and moisture and is often used as a major portion of the tire innerliner composition and can be in a form of butyl rubber or halobutyl rubber such as, for example, bromobutyl rubber. For example, see U.S. Pat. No. 3,808,177. Butyl rubber is an isobutylene copolymer with a small amount of isoprene which typically contains only from about 0.5 to about 5 weight percent units derived from isoprene.

Halobutyl and butyl rubbers are usually one of the most expensive elastomers used in a tire. Given the competitive tire market and the continued need to lower the cost of manufacturing tires, there exists a desire to decrease the cost of innerliners while maintaining their performance.

SUMMARY OF THE INVENTION

The present invention is directed to a pneumatic tire comprising a carcass and an innerliner in direct contact with the carcass, the innerliner comprising a rubber composition comprising:

at least one elastomer selected from the group consisting of butyl rubber, chlorinated butyl rubber, brominated butyl rubber, synthetic polyisoprene, natural rubber, styrene butadiene rubber, polybutadiene, copolymer of isobutylene and paramethylstyrene, and brominated copolymer of isobutylene and paramethylstyrene;

epichlorohydrin rubber; and at least one delaminated talc having a BET surface area according to DIN 66131 of 10-40 m$^2$/g, an average particle size ($D_{50}$) of 4-8 microns, determined by laser diffraction measurement, and a lamellarity index of 3-15.

The present invention is further directed to a pneumatic tire comprising a carcass and an innerliner in direct contact with the carcass, the innerliner comprising a rubber composition comprising:

100 parts by weight of at least one elastomer selected from the group consisting of butyl rubber, chlorinated butyl rubber, brominated butyl rubber, synthetic polyisoprene, natural rubber, styrene butadiene rubber, polybutadiene, copolymer of isobutylene and paramethylstyrene, and brominated copolymer of isobutylene and paramethylstyrene;

from 1 to 10 parts by weight, per 100 parts by weight of elastomer (phr) of epichlorohydrin rubber; and from 10 to 70 phr of at least one delaminated talc having a BET surface area according to DIN 66131 of 10-40 m$^2$/g, an average particle size ($D_{50}$) of 4-8 microns, determined by laser diffraction measurement, and a lamellarity index of 3-15.

DESCRIPTION OF THE INVENTION

There is disclosed a pneumatic tire comprising a carcass and an innerliner in direct contact with the carcass, the innerliner comprising a rubber composition comprising:

at least one elastomer selected from the group consisting of butyl rubber, chlorinated butyl rubber, brominated butyl rubber, synthetic polyisoprene, natural rubber, styrene butadiene rubber, polybutadiene, copolymer of isobutylene and paramethylstyrene, and brominated copolymer of isobutylene and paramethylstyrene;

epichlorohydrin rubber; and at least one delaminated talc having a BET surface area according to DIN 66131 of 10-40 m$^2$/g, an average particle size ($D_{50}$) of 4-8 microns, determined by laser diffraction measurement, and a lamellarity index of 3-15.

There is further disclosed a pneumatic tire comprising a carcass and an innerliner in direct contact with the carcass, the innerliner comprising a rubber composition comprising:

100 parts by weight of at least one elastomer selected from the group consisting of butyl rubber, chlorinated butyl rubber, brominated butyl rubber, synthetic polyisoprene, natural rubber, styrene butadiene rubber, polybutadiene, copolymer of isobutylene and paramethylstyrene, and brominated copolymer of isobutylene and paramethylstyrene;

from 1 to 10 parts by weight, per 100 parts by weight of elastomer (phr) of epichlorohydrin rubber; and from 10 to 70 phr of at least one delaminated talc having a BET surface area according to DIN 66131 of 10-40 m$^2$/g, an average particle size ($D_{50}$) of 4-8 microns, determined by laser diffraction measurement, and a lamellarity index of 3-15.

It has been found unexpectedly that an inclusion in the tire innerliner rubber composition of an elastomer, a delaminated talc and a epichlorohydrin rubber results in an innerliner with a faster cure than is possible without the epichlorohydrin rubber.

In the description of the invention, the term "phr" relates to parts by weight of a particular ingredient per 100 parts by weight of rubber contained in a rubber composition. The terms "rubber" and "elastomer" are used interchangeably unless otherwise indicated, the terms "cure" and "vulcanize" may be used interchangeably unless otherwise indicated and the terms "rubber composition" and "rubber compound" may be used interchangeably unless otherwise indicated. The term "butyl type rubber" is used herein to refer to butyl rubber (copolymer of isobutylene with a minor amount comprised of, for example about 0.5 to 5 weight percent, alternatively from 1 to about 3 percent, of units derived from isoprene), and halobutyl rubber as chlorobutyl rubber and bromobutyl rubber (chlorinated and brominated butyl rubber, respectively) unless otherwise indicated.

The rubber composition for use in the innerliner of the present invention include an elastomer. Suitable elastomers include butyl type rubber, including butyl rubber and halobutyl rubbers such as chlorobutyl rubber and bromobutyl rubber. Other suitable elastomers include synthetic polyisoprene, natural rubber, styrene butadiene rubber, and polybutadiene.

An alternative butyl rubber for the innerliner is comprised of a brominated copolymer of isobutylene and paramethylstyrene. The brominated copolymer conventionally contains from about 0.3 to about 2 weight percent bromination. Exemplary of such a brominated copolymer is Exxpro® from ExxonMobil Chemical reportedly having a Mooney (ML 1+8) viscosity at 125° C. of from about 45 to about 55, a paramethylstyrene content of about 5 weight percent, isobutylene content of about 94 to about 95 weight percent, and a bromine content of about 0.8 weight percent. Alternately, the butyl rubber may be comprised of a combination of a copolymer of isobutylene and isoprene together with a brominated copolymer of isobutylene and paramethylstyrene.

The rubber composition for use in the innerliner also includes at least one delaminated talc which is distinguished by a BET surface area according to DIN 66131 of 10-40 m$^2$/g and an average particle size ($D_{50}$) of 4-8 microns, measured by means of laser diffraction of coherent light. The lamellarity index of the talc is 3-15 and is a measure of the talc morphology, i.e., of the degree of delamination (delamination of the layers). For the same fineness of the talc (determined by laser diffraction), a higher lamellarity index indicates a higher talc structure. The lamellarity index characterizes the shape of the particle, and more particularly its flatness (large dimension/thickness). The lamellarity index may be measured by the difference between, on the one hand, the value of the mean dimension of the particles of the powder obtained by a particle size measurement by Malvern laser diffraction using a wet method (standard AFNOR NFX11-666) and on the other hand, the value of the mean diameter $D_{50}$ obtained by a measurement by sedimentation using a "Sedigraph" (standard AFNOR X11-683), this difference being related to the mean diameter $D_{50}$. Reference may be made to the article G. Baudet and J. P. Rona, Ind. Min. Mines et Carr. Les techn. June, July 1990, pp 55-61, which shows that this index is correlated to the mean ratio of the largest dimension of the particle to its smallest dimension.

A talc having the abovementioned property can be prepared, for example, in the wet process according to U.S. Pat. No. 6,348,536 B1. In one embodiment, such a talc is available as Mistron talc from Rio Tinto.

In one embodiment, the amount of talc may be present in the rubber composition in an amount ranging from 10 to 70 phr. In another embodiment, the amount of talc may be present in the rubber composition in an amount ranging from 20 to 50 phr.

The rubber composition also includes epichlorohydrin rubber. Epichlorohydrin rubber suitable for use includes (1) homopolymers of epichlorohydrin, (2) copolymers of an epiochlorohydrin with less than 30% of saturated epoxy monomers or with an unsaturated epoxy monomer, and (3) terpolymers of an epichlorohydrin with (a) less than 30% of a saturated epoxy monomer or mixtures thereof, (b) an unsaturated epoxy monomer or mixtures thereof, or (c) mixtures of (a) and (b). The epichlorohydrin polymers are prepared by polymerizing a monomeric epichlorohydrin alone or together with one or more of the aforementioned epoxy monomers with a suitable catalyst, such as an organometallic catalyst. For example, a reaction product of water with an alkyl aluminum compound is a suitable organometallic catalyst. Typical saturated epoxy monomers include alkylene oxides, such as ethylene oxide, and typical unsaturated epoxy monomers include allylglycidyl ether. The properties and the preparation of epichlorohydrin polymers suitable for use in the practice of this invention are known in the art and are described, for example, in U.S. Pat. No. 3,158,500, the disclosure of which is incorporated herein by reference.

Various epichlorohydrin rubbers may be used. In one embodiment, the epichlorohydrin rubber is of the series Hydrin including Hydrin H1100 from Zeon.

In one embodiment, the rubber composition includes from 1 to 10 phr of epichlorohydrin rubber. In one embodiment, the rubber composition includes from 2 to 8 phr of epichlorohydrin rubber. In one embodiment, the rubber composition includes from 3 to 6 phr of epichlorohydrin rubber.

In addition to the aforesaid elastomers, talc, and epichlorohydrin rubber, for the tire innerliner, the innerliner rubber composition may also contain other conventional ingredients commonly used in rubber vulcanizates, for example, tackifier resins, processing aids, carbon black, silica, talc, clay, mica, antioxidants, antiozonants, stearic acid, activators, waxes and oils as may be desired. Carbon black may be used in a range, for example, of from 10 to 80 phr. In one embodiment, the total amount of talc and carbon black in the composition ranges from 10 to 30 percent by volume.

The vulcanization of the compound for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in an amount ranging from about 0.2 to 5.0 phr with a range of from about 0.5 to 3.0 being preferred.

Accelerators are used to control the time and/or temperature required for vulcanization and to improve the properties of the vulcanizate. A single accelerator system may be used, i.e., primary accelerator in conventional amounts ranging from about 0.5 to 3.0 phr. In the alternative, combinations of 2 or more accelerators may be used which may consist of a primary accelerator which is generally used in the larger amount (0.3 to 3.0 phr), and a secondary accelerator which is generally used in smaller amounts (0.05 to 1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide.

Various synthetic, amorphous silicas may be used for the tire innerliner composition. Representative of such silicas are, for example and not intended to be limiting, precipitated silicas as, for example, HiSil 210™ and HiSil 243™ from PPG Industries, as well as various precipitated silicas from J.M. Huber Company, various precipitated silicas from Degussa Company and various precipitated silicas from Rhodia Company.

Various coupling agents may be used for the various synthetic, amorphous silicas, particularly the precipitated silicas, to couple the silica aggregates to various of the elastomers. Representative of such coupling agents are, for example and not intended to be limiting, bis(3-trialkoxysilylpropyl) polysulfides wherein at least two, and optionally all three, of its alkoxy groups are ethoxy groups and its polysulfidic bridge is comprised of an average of from about 2 to about 4, alternatively from about 2 to about 2.6 or an average of from about 3.4 to about 3.8 connecting sulfur atoms, and an alkoxyorganomercaptosilane which may optionally have its mercpto moiety blocked with a suitable blocking agent during the mixing thereof with the rubber composition, wherein said alkoxy group is preferably an ethoxy group.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

In practice the innerliner rubber composition, or compound, is formed into a gum strip. As known to those skilled in the art, a gum strip is produced by a press or passing a rubber compound through a mill, calender, multi-head extruder or other suitable means. Preferably, the gum strip is produced by a calender because greater uniformity is believed to be provided. The uncured gum strip is then constructed as an inner surface (exposed inside surface) of an uncured rubber tire structure, also known as the carcass. The innerliner is then sulfur co-cured with the tire carcass during the tire curing operation under conditions of heat and pressure.

Vulcanization of the tire of the present invention is generally carried out, for example, at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being co-cured therewith.

Therefore, in practice, the innerliner may, for example, be first constructed as an inner surface of an uncured rubber tire as an uncured compounded rubber gum strip and is then co-cured with the tire during a tire curing operation wherein the said rubber gum strip may have, for example, a thickness in the range of about 0.04 to about 1, alternately in a range of from about 0.05 to about 0.5, centimeters, depending somewhat the type, size and intended use of the tire.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE 1

In this example, the effect of dispersing a talc and epichlorohydrin rubber in a butyl rubber innerliner composition is illustrated. All amounts are in parts by weight. The rubber compositions were mixed using a two phase mixing procedure, with addition of the elastomers and fillers in a first, non-productive mix step, followed by addition of conventional amounts of curatives in a second, productive mix step, to obtain a rubber compound following recipes as shown in Table 1.

Samples made following the recipes of Table 1 were tested for various physical properties, as shown in Table 2.

As seen in Tables 1-2, the combination of the talc and 5 phr epichlorohydrin rubber shows significantly improved cure time T90 as compared with control. Such behavior is unexpected and surprising, suggesting a synergistic effect of the combination of the talc and epichlorohydrin rubber.

TABLE 1

| Sample No. | 1 | 2 | 3 | 4 | 5 | 6 |
|---|---|---|---|---|---|---|
| Non Productive Mix Stage | | | | | | |
| Epichlorohydrin Rubber[1] | 0 | 0 | 5 | 10 | 15 | 0 |
| Butyl Rubber | 100 | 100 | 95 | 90 | 85 | 90 |
| Carbon Black | 50 | 14 | 14 | 14 | 14 | 14 |
| Tackifying resin[2] | 2 | 2 | 2 | 2 | 2 | 2 |
| Resin[3] | 10 | 10 | 10 | 10 | 10 | 10 |
| Naphthenic oil | 1.5 | 1.5 | 1.5 | 1.5 | 1.5 | 1.5 |
| Stearic Acid | 2 | 2 | 2 | 2 | 2 | 2 |
| Talc[4] | 0 | 40 | 40 | 40 | 40 | 40 |
| Productive Mix Stage | | | | | | |
| Epichlorohydrin Rubber[1] | 0 | 0 | 0 | 0 | 0 | 10 |
| 2,2'-benzothiazyl disulfide | 1.3 | 1.3 | 1.3 | 1.3 | 1.3 | 1.3 |
| Zinc Oxide | 1 | 1 | 1 | 1 | 1 | 1 |
| Sulfur | 0.5 | 0.5 | 0.5 | 0.5 | 0.5 | 0.5 |

[1]Hydrin H1100 obtained from Zeon Europe GMBH
[2]Phenol-formaldehyde type tackifying resin obtained as SP-1068 Resin from the Schenectady Company
[3]Mixture of alkylated naphthenic and aromatic resins obtained as Struktol 40-MS
[4]Mistron HAR T84 obtained from Rio Tinto

TABLE 2

| Sample No. | 1 | 2 | 3 | 4 | 5 | 6 |
|---|---|---|---|---|---|---|
| Epichlorohydrin Rubber | 0 | 0 | 5 | 10 | 15 | 0 |
| MDR2000 Cured at 150° C. | | | | | | |
| Max Torque, dN-m | 4.63 | 3.27 | 3.45 | 3.67 | 4.01 | 3.7 |
| Final Torque, dN-m | 4.56 | 3.26 | 3.44 | 3.67 | 4 | 3.7 |
| Delta Torque, dN-m | 3.02 | 2.15 | 2.33 | 2.54 | 2.91 | 2.6 |
| $T_{25}$, min | 5.24 | 7.24 | 7.86 | 8.55 | 8.63 | 8.6 |
| $T_{90}$, min | 20.2 | 53.1 | 39.8 | 47.7 | 47.7 | 48.2 |
| MV2000 Plasticity at 100° C. | | | | | | |
| Final Viscosity, mooney | 33.5 | 24.5 | 23.9 | 23.2 | 22.7 | 22.9 |
| MV2000 Scorch at 121° C. | | | | | | |
| T + 5, min | 31.82 | 45.07 | 47.12 | 51.68 | 48.05 | 49.2 |
| T + 20, min | 41.98 | 54.78 | 58.13 | — | — | — |
| RPA 2000 at 100° C., Strain Sweep at 1 Hz | | | | | | |
| G' @ 1% strain, MPa | 0.57 | 0.33 | 0.34 | 0.35 | 0.35 | 0.34 |
| G' @ 5% strain, MPa | 0.53 | 0.31 | 0.32 | 0.33 | 0.33 | 0.33 |
| G' @ 10% strain, MPa | 0.29 | 0.2 | 0.21 | 0.21 | 0.22 | 0.21 |
| TD @ 1% strain | 0.217 | 0.229 | 0.227 | 0.226 | 0.221 | 0.227 |
| TD @ 5% strain | 0.234 | 0.249 | 0.234 | 0.242 | 0.238 | 0.232 |
| TD @ 10% strain | 0.257 | 0.271 | 0.258 | 0.252 | 0.243 | 0.251 |

TABLE 2-continued

| Sample No. | 1 | 2 | 3 | 4 | 5 | 6 |
|---|---|---|---|---|---|---|
| Ring Modulus Cured 18 min at 150° C., test at 23° C. | | | | | | |
| Elongation at Break, % | 834 | 789 | 826 | 774 | 674 | 648 |
| Specific Energy, MPa | 31.7 | 24.1 | 23.5 | 20.2 | 17.1 | 15.9 |
| True Tensile | 73.2 | 48.8 | 47.4 | 34.3 | 29.9 | 27.2 |
| 100% Modulus, MPa | 1.23 | 1.7 | 1.7 | 1.77 | 1.9 | 1.8 |
| 300% Modulus, MPa | 3.54 | 3.25 | 2.97 | 2.84 | 2.94 | 2.8 |
| 500% Modulus, MPa | 5.58 | 4.20 | 3.76 | 3.51 | 3.57 | 3.5 |
| Rebound, % | 11.2 | 11.2 | 10.8 | 10.8 | 10.6 | 11 |
| Shore A | 51.6 | 50.1 | 52.3 | 54.7 | 54.8 | 56.4 |
| Tensile Strength, MPa | 7.83 | 5.44 | 5.12 | 3.90 | 3.68 | 3.5 |
| Zwick Rebound Cured 18 min at 150° C. | | | | | | |
| Rebound at 0 C., % | 6 | 5.4 | 5.6 | 6 | 5.8 | 6 |
| Rebound at 100° C., % | 39.8 | 41.8 | 41.2 | 40.6 | 41 | 40.6 |
| Instron Tear, Cured 18 min at 150° C., test at 23° C. | | | | | | |
| Tear Strength, N/mm | 29.91 | 15.45 | 15.54 | 14.52 | 12.82 | 11.3 |
| Air Diffusion Cured 18 min at 150° C., test at 90° C. | | | | | | |
| Diffusion, $10^8$ cm$^3$/m | 6.59 | 3.81 | 3.52 | 3.43 | 3.4 | 3.2 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a carcass and an innerliner in direct contact with the carcass, the innerliner comprising a rubber composition comprising:
    butyl rubber;
    epichlorohydrin rubber; and
    at least one delaminated talc having a BET surface area according to DIN 66131 of 10-40 m$^2$/g, an average particle size ($D_{50}$) of 4-8 microns, determined by laser diffraction measurement, and a lamellarity index of 3-15;
    wherein the amount of epichlorohydrin rubber ranges from 1 to 5 phr.

2. The pneumatic tire of claim 1, wherein the amount of talc ranges from 10 to 70 phr.

3. The pneumatic tire of claim 1, wherein the amount of talc ranges from 20 to 50 phr.

4. The pneumatic tire of claim 1, wherein the amount of epichlorohydrin rubber ranges from 2 to 5 phr.

5. The pneumatic tire of claim 1, wherein the amount of epichlorohydrin rubber ranges from 3 to 5 phr.

6. The pneumatic tire of claim 1, wherein the rubber composition further comprises from 10 to 80 phr of carbon black.

7. The pneumatic tire of claim 1, wherein the total amount of talc and carbon black in the rubber composition ranges from 10 to 30 percent by volume.

8. A pneumatic tire comprising a carcass and an innerliner in direct contact with the carcass, the innerliner comprising a rubber composition comprising:
    100 parts by weight of butyl rubber;
    from 1 to 5 parts by weight, per 100 parts by weight of elastomer (phr) of epichlorohydrin rubber; and
    from 10 to 70 phr of at least one delaminated talc having a BET surface area according to DIN 66131 of 10-40 m$^2$/g, an average particle size ($D_{50}$) of 4-8 microns, determined by laser diffraction measurement, and a lamellarity index of 3-15.

9. The pneumatic tire of claim 1, wherein the amount of epichlorohydrin rubber is about 5 phr.

10. The pneumatic tire of claim 1, wherein the amount of epichlorohydrin rubber is 5 phr.

11. The pneumatic tire of claim 1, further comprising curatives consisting of zinc oxide, stearic acid, sulfur, and 2,2'-benzothiazole disulfide.

12. The pneumatic tire of claim 4, further comprising curatives consisting of zinc oxide, stearic acid, sulfur, and 2,2'-benzothiazole disulfide.

13. The pneumatic tire of claim 5, further comprising curatives consisting of zinc oxide, stearic acid, sulfur, and 2,2'-benzothiazole disulfide.

14. The pneumatic tire of claim 8, further comprising curatives consisting of zinc oxide, stearic acid, sulfur, and 2,2'-benzothiazole disulfide.

15. The pneumatic tire of claim 9, further comprising curatives consisting of zinc oxide, stearic acid, sulfur, and 2,2'-benzothiazole disulfide.

16. The pneumatic tire of claim 10, further comprising curatives consisting of zinc oxide, stearic acid, sulfur, and 2,2'-benzothiazole disulfide.

* * * * *